(12) United States Patent
Manjeshwar et al.

(10) Patent No.: US 7,835,383 B2
(45) Date of Patent: Nov. 16, 2010

(54) METHOD AND SYSTEM FOR PROVIDING A MODIFIED TIMED DIVISION MULTIPLE ACCESS (TDMA) FOR REDUCED DELAY

(75) Inventors: Arati Manjeshwar, Chandler, AZ (US); Falk Herrmann, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 1094 days.

(21) Appl. No.: 11/241,639

(22) Filed: Sep. 30, 2005

(65) Prior Publication Data

US 2007/0076655 A1 Apr. 5, 2007

(51) Int. Cl.
  *H04L 12/413* (2006.01)
  *H04L 12/43* (2006.01)
  *H04J 3/02* (2006.01)

(52) U.S. Cl. .................. 370/445; 370/458; 370/462

(58) Field of Classification Search .............. 370/431, 370/438, 439, 445, 447, 448, 458, 461, 462
See application file for complete search history.

(56) References Cited

U.S. PATENT DOCUMENTS

| | | | |
|---|---|---|---|
| 5,319,641 A * | 6/1994 | Fridrich et al. ............. | 370/447 |
| 5,343,474 A | 8/1994 | Driscoll | |
| 5,367,524 A | 11/1994 | Rideout | |
| 5,463,628 A * | 10/1995 | Sorensen ................... | 370/467 |
| 5,471,474 A | 11/1995 | Grobicki | |
| 6,711,177 B1 | 3/2004 | Young | |
| 6,990,116 B1 * | 1/2006 | Young et al. ................ | 370/445 |
| 2003/0016770 A1 * | 1/2003 | Trans et al. ................. | 375/346 |
| 2003/0108059 A1 * | 6/2003 | Yew et al. ................... | 370/443 |
| 2003/0174665 A1 | 9/2003 | Benveniste | |
| 2004/0213191 A1 | 10/2004 | Lee | |
| 2005/0002373 A1 | 1/2005 | Watanabe | |
| 2005/0058149 A1 * | 3/2005 | Howe ......................... | 370/428 |

FOREIGN PATENT DOCUMENTS

| | | |
|---|---|---|
| EP | 0 833 471 | 4/1998 |
| JP | 09-051299 | 2/1997 |
| WO | WO 97/48249 | 12/1997 |
| WO | WO 01/33739 | 5/2001 |
| WO | WO 03/053010 | 6/2003 |

OTHER PUBLICATIONS

European Search Report for EP 06 02 0091, Date Nov. 22, 2006.
European Search Report in corresponding European Patent Application No. EP 06 02 0091 dated Jan. 29, 2007.

* cited by examiner

Primary Examiner—Aung S Moe
Assistant Examiner—Kerri M Rose
(74) Attorney, Agent, or Firm—Kenyon & Kenyon LLP

(57) ABSTRACT

A method for shared access of a communication channel is provided, which includes dividing access to the communication channel into a plurality of time slots, and allocating the time slots, at least partially, based on a priority of use of the communication channel.

31 Claims, 3 Drawing Sheets

METHOD AND SYSTEM FOR PROVIDING A MODIFIED TIMED DIVISION MULTIPLE ACCESS (TDMA) FOR REDUCED DELAY

CROSS REFERENCE TO RELATED APPLICATIONS

This application is related to U.S. patent application Ser. No. 11/239,836 filed Sep. 30, 2005; U.S. patent application Ser. No. 11/239,837 filed Sep. 30, 2005, and which issued on May 19, 2009 as U.S. Pat. No. 7,536,194; U.S. patent application Ser. No. 11/240,401 filed Sep. 30, 2005; U.S. patent application Ser. No. 11/240,434 filed Sep. 30, 2005; U.S. patent application Ser. No. 11/240,436 filed Sep. 30, 2005, and which issued on Sep. 16, 2008 as U.S. Pat. No. 7,426,190; U.S. patent application Ser. No. 11/240,545 filed Sep. 30, 2005; U.S. patent application Ser. No. 11/241,296 filed Sep. 30, 2005; U.S. patent application Ser. No. 11/241,298 filed Sep. 30, 2005; and U.S. patent application Ser. No. 11/241,300 filed Sep. 30, 2005. The disclosure of each of the foregoing related applications is hereby incorporated by reference herein in its entirety.

FIELD OF INVENTION

The present invention relates to a method and apparatus for accessing a shared communications channel, so as to provide a modified timed division multiple access (TDMA) for reduced delay.

BACKGROUND INFORMATION

Certain communication networks, including wired or wireless communication networks, may use the Time Division Multiple Access (TDMA) communications protocol to resolve contention for shared access to a communication channel. For example, if two nodes of a network attempt to communicate on the same communications channel at the same time, this may lead to a collision, which may be prevented by assigning an exclusive time slot to each node. However, with such exclusively assigned times slots the communication channel resource may be under utilized if either of the two nodes do not communicate during their exclusively assigned time slot.

Another approach used for shared channel access is the Carrier Sense Multiple Access (CSMA) communication protocol, in which network nodes listen and wait for a free channel before they attempt to communicate. However, if one node has a high priority message (sometimes referred to as a low latency message) to send, and another node is accessing the channel to send a low priority message, then the node with the high priority message to send may be required to wait until the node that is sending the low priority message is finished sending the low priority message before the high priority message may be sent.

SUMMARY OF THE INVENTION

An exemplary embodiment and/or exemplary method of the present invention provides a modified Time Division Multiple Access (TDMA) communications protocol to reduce delays for low-latency messages, in which time slots are allocated for activities rather than for devices which need to access the channel.

An exemplary embodiment and/or exemplary method of the present invention also provides a method for accessing a shared communication channel, which combines aspects of two communication protocols (e.g., a combined Time Division Multiple Access and Carrier Sense Multiple Access (TDMA/CSMA) communications protocol) to reduce the delays for high priority (low latency) messages.

According to an exemplary embodiment and/or exemplary method of the present invention, a modified Time Division Multiple Access/Carrier Sense Multiple Access (TDMA/CSMA) communication protocol is provided, in which time slots are allocated for activities rather than for devices which need to access the channel. The activities may include, for example, a particular type of activity (e.g., supervision, back channel, alarm notification), and may be classified, for example, according to a relative priority or importance (e.g., high priority or low priority).

An exemplary embodiment and/or exemplary method of the present invention is directed to a method for shared access of a communication channel, the method including dividing access to the communication channel into a plurality of time slots, and allocating the time slots, at least partially, based on a priority of use of the communication channel.

Another exemplary embodiment and/or exemplary method of the present invention is directed to a method for shared access of a communication channel, in which the priority of use includes transmitting one of a high priority message and low priority message.

Yet another exemplary embodiment and/or exemplary method of the present invention is directed to a method for shared access of a communication channel, in which the priority of use includes transmitting a supervision message.

Still another exemplary embodiment and/or exemplary method of the present invention is directed to a method for shared access of a communication channel, in which the priority of use includes transmitting a back channel message.

Yet another exemplary embodiment and/or exemplary method of the present invention is directed to a method for shared access of a communication channel, in which the priority of use includes transmitting an alarm message.

Still another exemplary embodiment and/or exemplary method of the present invention is directed to a method for shared access of a communication channel, the method including allocating a subset of the time slots as exclusive.

Yet another exemplary embodiment and/or exemplary method of the present invention is directed to a method for shared access of a communication channel, the method including resolving a contention for a non-exclusive time slot using a Carrier Sense Multiple Access (CSMA) communications protocol, where the contention for the time slot arises if more than one device attempts to access a particular time slot.

An exemplary embodiment and/or exemplary method of the present invention is directed to a network, which includes at least two node elements configured to communicate on a shared communication channel, in which the at least two nodes are configured to communicate a predefined message in a predefined time slot.

Still another exemplary embodiment and/or exemplary method of the present invention is directed to a network, in which the predefined message includes a high priority message and a low priority message.

Yet another exemplary embodiment and/or exemplary method of the present invention is directed to a network, in which the predefined message is a supervision message.

Still another exemplary embodiment and/or exemplary method of the present invention is directed to a network, in which the predefined message is a back channel message.

Yet another exemplary embodiment and/or exemplary method of the present invention is directed to a network, in which the predefined message is an alarm message.

Still another exemplary embodiment and/or exemplary method of the present invention is directed to a network, in which the predefined time slot is allocated, at least partially, based on a priority of use of the shared communication channel.

Yet another exemplary embodiment and/or exemplary method of the present invention is directed to a network, in which the at least two node elements are configured to refrain from accessing the shared communication channel during a time slot exclusively reserved for another node, and to resolve a contention for a non-exclusively reserved time slot using a Carrier Sense Multiple Access (CSMA) communications protocol.

An exemplary embodiment and/or exemplary method of the present invention is directed to a method for shared access of a communication channel, the method including dividing access to the communication channel into a plurality of time slots, allocating the time slots, at least partially, based on a priority of use of the communication channel, allocating a subset of the time slots as exclusive, and resolving a contention for a non-exclusive time slot using a multiple access communications protocol, wherein the contention for the time slot arises if more than one device attempts to access a particular time slot.

Another exemplary embodiment and/or exemplary method of the present invention is directed to a method for shared access of a communication channel, in which the subset of the time slots are allocating using a Time Division Multiplex Access (TDMA) communications protocol.

Yet another exemplary embodiment and/or exemplary method of the present invention is directed to a method for shared access of a communication channel, in which the multiple access communications protocol is a Carrier Sense Multiple Access (CSMA) communications protocol.

Still another exemplary embodiment and/or exemplary method of the present invention is directed to a method for shared access of a communication channel, in which subset of the time slots are allocating using a Time Division Multiplex Access (TDMA) communications protocol and the multiple access communications protocol is a Carrier Sense Multiple Access (CSMA) communications protocol.

Yet another exemplary embodiment and/or exemplary method of the present invention is directed to a method for shared access of a communication channel, in which the time slots are configurable in size.

Still another exemplary embodiment and/or exemplary method of the present invention is directed to a method for shared access of a communication channel, in which the size is configurable according to the priority of use of the communication channel.

DETAILED DESCRIPTION

Figure 1:
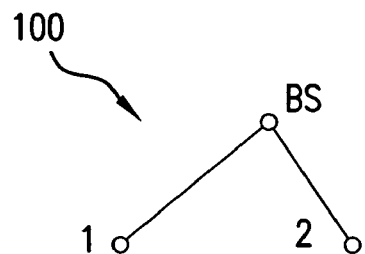
FIG. 1 shows an exemplary communication network, which includes a first node, a second node, and a base station that share a common communications channel.

FIG. 1 shows an exemplary communication network 100, which includes nodes a first node 1, a second node 2, and a base station BS that share a common communications channel. In particular, the first node 1, the second node 2, and the base station BS may use the shared common communications channel to exchange messages. In this regard, the shared communications channel may be wireless or wireline.

Figure 2:
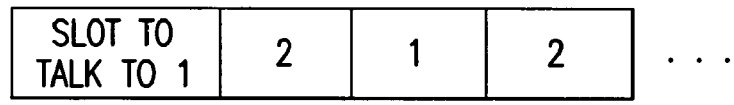
FIG. 2 shows an exemplary time slot allocation for the shared communications channel of FIG. 1, in which the first node and the second node operate according to the Time Division Multiple Access (TDMA) communication protocol.

FIG. 2 shows an exemplary time slot allocation for the shared communications channel of FIG. 1, in which the first node 1 and the second node 2 operate according to the Time Division Multiple Access (TDMA) communication protocol. In this regard, the communication channel may be shared based on an allocation of exclusive time slots for each node. In particular, the exclusive time slots may be allocated in an alternating fashion, that is, the first node 1 is allocated a first exclusive time slot, and the second node 2 is allocated a second exclusive time slot following the first exclusive time slot, etc. In this regard, it is assumed that the nodes are properly synchronized and are aware of their exclusively assigned time slot(s).

Figure 3:
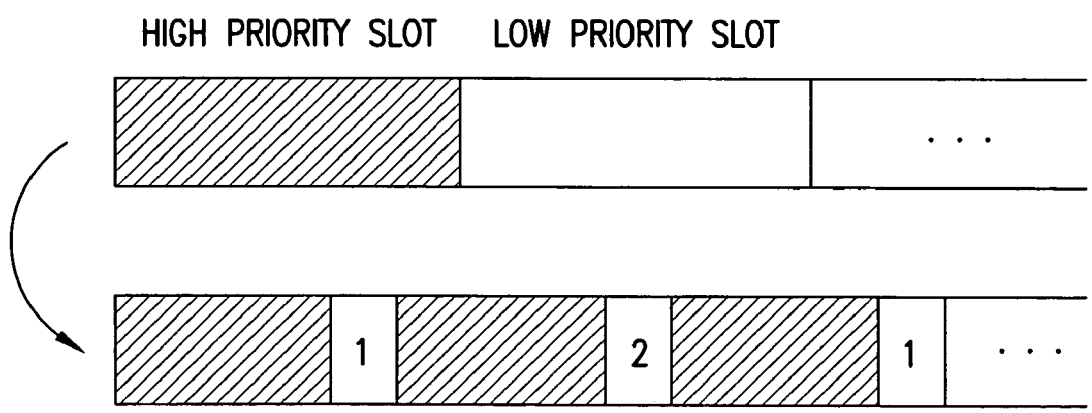
FIG. 3 shows an exemplary time slot allocation for accessing the shared communication channel of FIG. 1, in which the first node and the second node are each allocated exclusive time slots, and additional time slots are allocated for sending high priority messages by either the first node or the second node.

FIG. 3 shows an exemplary time slot allocation for accessing the shared communication channel of FIG. 1, in which the first node 1 and the second node 2 are each allocated exclusive time slots, and additional time slots are allocated for sending high priority messages by either the first node 1 or the second node 2. In FIG. 3, an additional time slot for sending high priority messages is allocated prior to each exclusive slot allocated to the first node 1, and prior to each exclusive time slot allocated to the second node 2, however, more or fewer additional time slots for sending high priority messages may be allocated depending on network conditions and/or certain requirements.

In FIG. 2, the first time slot that is allocated for the first node 1 is configured to be large enough to accommodate the maximum size of one high priority message or one low priority message, or large enough to accommodate the combination of one high priority message and one low priority message.

In FIG. 3, the high priority message time slot is configured to be large enough to accommodate only one high priority message, and the low priority slot is configured to be large enough to accommodate only one low priority message. If the first node 1 or the second node 2 have a high priority message to send, they may send the high priority message in the high priority message time slot using the Carrier Sense Multiple Access (CSMA) communication protocol. Hence, either the first node 1 or the second node 2 may send a message in the high priority message time slot. By contrast, if the first node or the second node 2 have a low priority message to send, they may only send the low priority message in their exclusively assigned low priority message time slot. However, the first node 1 and the second node 2 may send the low priority message without using the Carrier Sense Multiple Access (CSMA) protocol since their exclusively assigned low priority message time slots are separate and distinct from one another.

It is noted here that the high priority message and low priority message time slots may be configured to occur in an alternating fashion, as shown, for example, in FIG. 3, or in any other suitable fashion depending on, for example, network system requirements and/or configuration. For example, the number of configured low priority message time slots may exceed the number of configured high priority message time slots. In this regard, it may be assumed, for example, that high priority messages occur less frequently than low priority messages.

Figure 4:
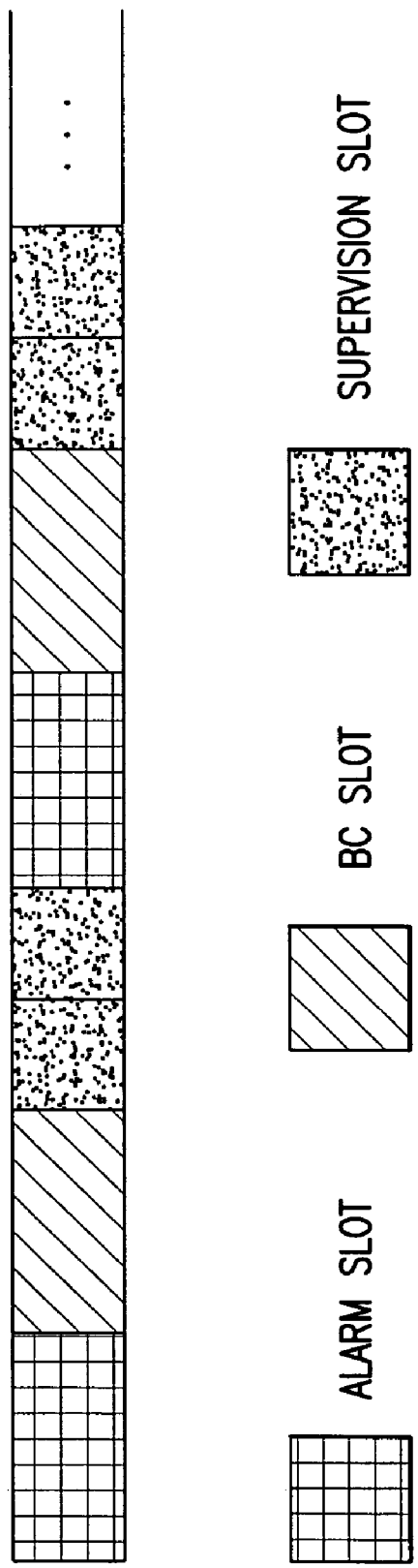
FIG. 4 shows an exemplary time slot allocation of the shared communication channel of FIG. 1, in which time slots are allocated for certain types of messages rather than for particular nodes, and the first node and the second node operate according to a modified Time Division Multiple Access/Carrier Sense Multiple Access (TDMA/CSMA) communication protocol.

FIG. 4 shows an exemplary time slot allocation of the shared communication channel of FIG. 1, in which time slots are allocated for certain types of messages rather than for particular nodes, and the first node 1 and the second node 2 operate according to a modified Time Division Multiple Access/Carrier Sense Multiple Access (TDMA/CSMA) communication protocol. In this instance, the types of messages include a supervision message, a back channel (BC) message, or an alarm message.

The supervision message is a low priority message sent by the base station BS to poll the status of a node which may respond in the same time slot or in a subsequent supervising time slot. Each node may have a certain time slot in which it is supervised. For example, the base station BS may poll for the first node 1 in a particular supervision time slot, in which the first node 1 may be configured to respond in the same time slot, or in a subsequent supervision time slot.

The back channel message (BC) is a high priority message that the base station BS sends, for example, to the first node 1, which may forward the message to nodes within its subtree if they exist.

The alarm message is a high priority message that the first node 1 and the second node 2 may send to the base station BS to alert the base station BS, for example, of a condition that requires attention. In this regard, the first node 1 and the second node 2 may be configured to send an alarm message in any available alarm message time slot, and therefore the first node 1 and the second node 2 may be required to access the communications channel during an alarm message time slot using, for example, the Carrier Sense Multiple Access (CSMA) communications protocol to avoid collision when sending alarm messages.

To reduce the delay further, the time slots reserved for the alarm and back channel messages may be configured to be smaller, allowing time only for access. If the first node 1 occupies the alarm slot and the first node 1 transmits a message and overflows into the next slot, back channel packets may sense a busy channel and may not transmit. The order of the time slots may determine, for example, their relative priority.

Figure 5:
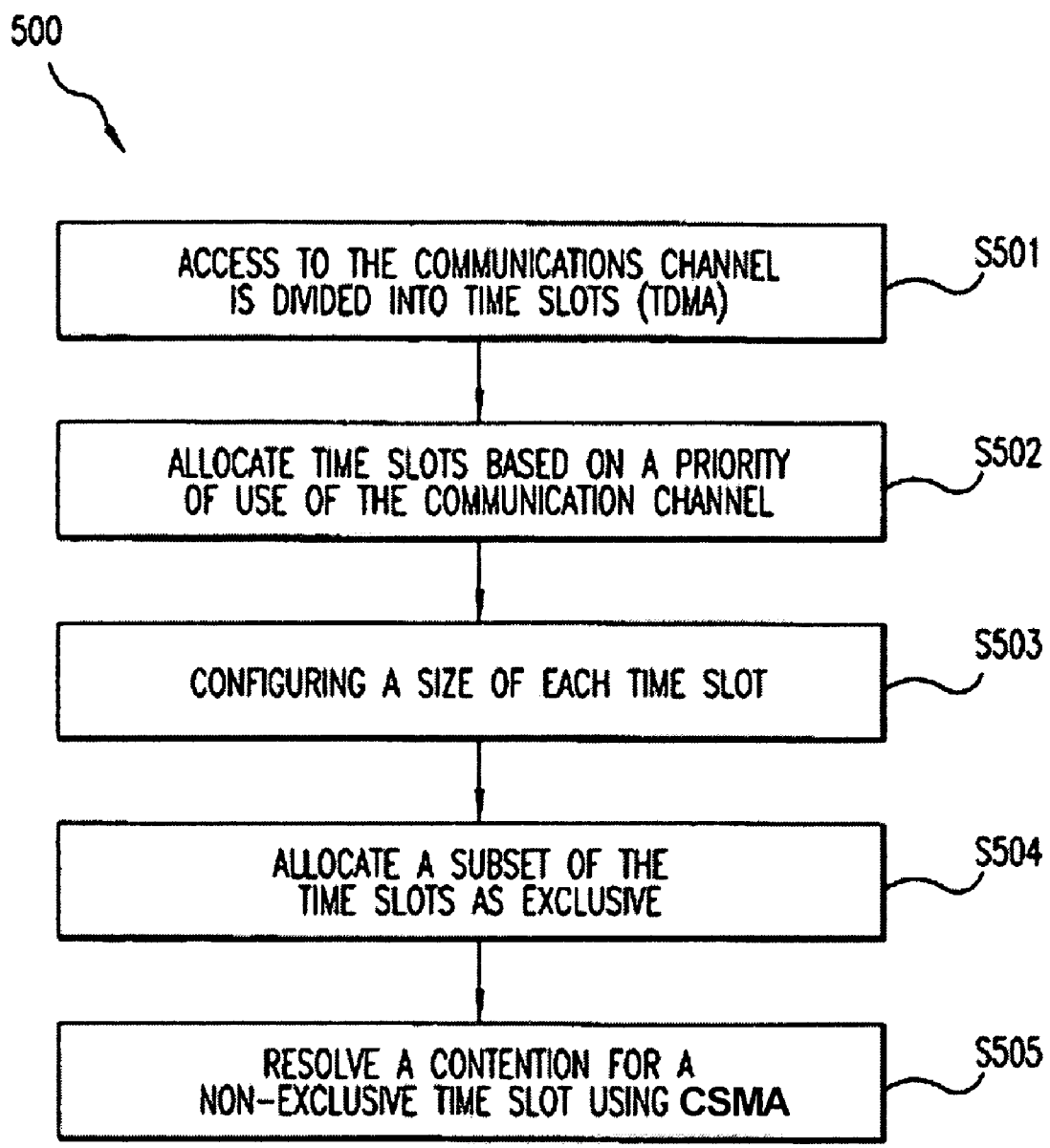
FIG. 5 shows an exemplary method for shared access of a communication channel.

FIG. 5 shows an exemplary method 500 for shared access of a communication channel. In this regard, the communication channel may be shared, for example, by one or more node elements of a wireless network. The node elements may arranged, for example, in a hierarchical manner, and may be configured to send and received certain messages on the communication channel, including for example, supervision messages, back channel (BC) messages, and alarm messages.

In step S501, access to the communication channel is divided into time slots, using, for example, the Time Division Multiple Access (TDMA) communications protocol. In step S502, the time slots are allocated based on a priority of use of the communication channel. For example, 10% of the total number of time slots may be allocated for the communication of supervision messages, 10% of the total number of time slots may be allocated for the communication of back channel (BC) messages, 10% of the total number of time slots may be allocated for the communication of alarm messages, and 70% of the total number of time slots may be allocated for the communication of other types of messages.

In step S503, the size of each time slot is configured. In this regard, the size of each time slot may be configured, for example, according to the priority of use of the communication channel. For example, time slots allocated for the communication of supervision messages may be configured to the longer than the time slots allocated for the communication of back channel (BC) messages, or visa versa.

In step S504, a subset of the time slots are allocated as exclusive to each node element, which shared access to the communication channel. Hence, in this manner, each node element is guaranteed a certain minimum amount of exclusive time to access the communication channel.

In step S505, if more than one node element attempts to access a particular non-exclusively allocated time slot, the contention for the non-exclusively allocated time slot is resolved using a multiple access communications protocol. In particular, the contention for the non-exclusively allocated time slot is resolved using the Carrier Sense Multiple Access (CSMA) communications protocol.

What is claimed is:

1. A method for shared access of a communication channel, the method comprising:
   dividing access to the communication channel into a plurality of time slots;
   for at least some of the time slots, allocating the time slots, with respect to accessing the communication channel, to use of the communication channel exclusively for performing particular corresponding activities;
   allocating a subset of the time slots, with respect to accessing the communication channel, as exclusive to particular corresponding nodes; and
   resolving a contention for one of the at least some of the time slots using a Carrier Sense Multiple Access (CSMA) communications protocol, for only those nodes that are waiting to perform the corresponding activity for which the time slot has been allocated.

2. The method of claim 1, wherein the corresponding activities include transmitting one of a high priority message and low priority message.

3. The method of claim 1, wherein the corresponding activities include transmitting a supervision message.

4. The method of claim 3, wherein the supervision message is sent by a base station to poll a status of one of the nodes.

5. The method of claim 4, wherein different ones of the at least some of the time slots are used for supervision messages sent to poll different ones of the nodes.

6. The method of claim 1, wherein the corresponding activities include transmitting an alarm message.

7. The method of claim 6, wherein the alarm message is sent by a node to a base station for alerting the base station of a condition that requires attention.

8. The method of claim 1, wherein the allocation of the at least some of the time slots allocated, with respect to accessing of the communication channel, to use of the communication channel exclusively for performing particular corresponding activities is according to a modified Time Division Multiple Access communications protocol.

9. A network comprising:
   at least two node elements configured to:
      communicate on a shared communication channel a message of a predefined activity in a time slot predefined as exclusive, with respect to accessing of the communication channel, for allocation of performance of the predefined activity;

refrain from accessing the shared communication channel during a time slot exclusively reserved for a node; and resolve a contention for the time slot predefined as exclusive, with respect to accessing of the communication channel, for allocation of performance of the predefined activity using a Carrier Sense Multiple Access (CSMA) communications protocol for only those nodes that are waiting to perform the predefined activity for which the time slot had been previously allocated.

10. The network of claim 9, wherein the predefined activity is to transmit one of a high priority message and a low priority message.

11. The network of claim 9, wherein the predefined activity is to transmit a supervision message.

12. The network of claim 9, wherein the predefined activity is to transmit an alarm message.

13. The network of claim 9, wherein the time slot predefined as exclusive, with respect to accessing of the communication channel, for allocation of performance of the predefined activity is allocated, at least partially, based on a priority of use of the shared communication channel.

14. A method for shared access of a communication channel, the method comprising:

dividing access to the communication channel into a plurality of time slots;

for a first subset of the time slots, allocating the time slots, with respect to accessing of the communication channel, to use of the communication channel exclusively for performing particular corresponding activities;

allocating a second subset of the time slots, with respect to accessing of the communication channel, as exclusive to particular corresponding nodes; and resolving a contention for one of the first subset of the time slots using a multiple access communications protocol, for only those nodes that are waiting to perform the corresponding activity for which the time slot has been allocated.

15. The method of claim 14, wherein the second subset of the time slots are allocated using a Time Division Multiplex Access (TDMA) communications protocol.

16. The method of claim 14, wherein the multiple access communications protocol is a Carrier Sense Multiple Access (CSMA) communications protocol.

17. The method of claim 14, wherein the second subset of the time slots are allocated using a Time Division Multiplex Access (TDMA) communications protocol and the multiple access communications protocol is a Carrier Sense Multiple Access (CSMA) communications protocol.

18. The method claim 17, wherein the time slots are configurable in size.

19. The method of claim 18, wherein the size is configurable according to the priority of use of the communication channel.

20. The method of claim 14, wherein the activities include transmission by a base station of a message to one of the nodes for the one of the nodes to forward to other nodes within a subtree of the one of the nodes.

21. The method of claim 14, wherein a respective one of the first subset of the time slots is allocated between each pair of sequentially scheduled ones of the second subset of the time slots.

22. The method of claim 14, wherein, for each of at least one of the activities, a time slot allocated, with respect to accessing the communication channel, to use of the communication channel exclusively for performing the respective activity is smaller than a time required for performing the activity.

23. The method of claim 22, wherein, once the time slot allocated, with respect to accessing the communication channel, to use of the communication channel exclusively for performing the respective activity is accessed for performing the activity, performance of the activity is continued into a following time slot.

24. The method of claim 23, wherein the following time slot is treated as busy, blocking accessing of the following time slot for its allocated activity.

25. The method of claim 14, wherein the communication channel is a wireline communication channel.

26. The method of claim 14, wherein the communication channel is a wireless communication channel.

27. The method of claim 14, wherein multiple ones of the second subset of time slots are scheduled between each pair of sequentially scheduled ones of the first subset of time slots.

28. The method of claim 14, wherein:

each of the activities is classified according to a respective priority level; and for each of the activities, a number of the firs subset of the time slots allocated to the respective activity depends on its respective classified priority level.

29. A method for sharing access of a communication channel among a plurality of nodes of a network, the method comprising:

dividing, by a hardware system, access to the communication channel into a plurality of time slots;

for at least some of the time slots, allocating, by the hardware system and with respect to accessing of the communication channel, the time slots to use of the communication channel exclusively for performing particular corresponding activities; and for each of the at least some of the time slots, providing, by the hardware system, access to the time slot, using a contention-based protocol, to only those nodes that are waiting to perform the corresponding activity for which the time slot has been allocated.

30. The method of claim 29, wherein the at least some of the time slots are not assigned to any node when no nodes are waiting to perform said corresponding activities, even if one or more nodes are waiting to use the communication channel for performance of another activity.

31. A method for shared access of a communication channel, the method comprising:

dividing access to the communication channel into a plurality of time slots;

for at least some of the time slots, allocating the time slots, with respect to accessing of the communication channel, to use of the communication channel exclusively for performing particular corresponding activities;

allocating a subset of the time slots, with respect to accessing of the communication channel, as exclusive to particular corresponding devices; and resolving a contention using a multiple access communications protocol, wherein the contention arises if more than one device attempts to access a particular one of the at least some of the time slots.

* * * * *